US010322701B2

(12) United States Patent
Hackl et al.

(10) Patent No.: US 10,322,701 B2
(45) Date of Patent: *Jun. 18, 2019

(54) FASTENING DEVICE FOR A WINDSCREEN WIPING DEVICE

(71) Applicant: Robert Bosch GmbH, Stuttgart (DE)

(72) Inventors: Viktor Hackl, Sopron (HU); Michael Weiler, Buehl (DE); Peter Deak, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/328,483

(22) PCT Filed: Jul. 10, 2015

(86) PCT No.: PCT/EP2015/065787
§ 371 (c)(1),
(2) Date: Jan. 23, 2017

(87) PCT Pub. No.: WO2016/012264
PCT Pub. Date: Jan. 28, 2016

(65) Prior Publication Data
US 2017/0210350 A1  Jul. 27, 2017

(30) Foreign Application Priority Data
Jul. 24, 2014  (DE) .......................... 10 2014 214 580

(51) Int. Cl.
*B60S 1/34* (2006.01)
*B60S 1/38* (2006.01)
(Continued)

(52) U.S. Cl.
CPC ............. *B60S 1/4077* (2013.01); *B60S 1/345* (2013.01); *B60S 1/3427* (2013.01);
(Continued)

(58) Field of Classification Search
CPC .... B60S 1/345; B60S 1/42; B60S 1/34; B60S 1/3459; B60S 1/3461; B60S 1/342;
(Continued)

(56) References Cited

U.S. PATENT DOCUMENTS 5,853,229 A    12/1998  Willmann et al.
6,249,929 B1 *  6/2001  Metz .......................... B60S 1/34
                                                  15/250.351
(Continued)

FOREIGN PATENT DOCUMENTS

CN          1784326 A    6/2006
CN        102947151 A    2/2013
(Continued)

OTHER PUBLICATIONS

Machine language translation of description portion of German publication 1091888, published Oct. 1960.*
(Continued)

*Primary Examiner* — Gary K. Graham
(74) *Attorney, Agent, or Firm* — Michael Best & Friedrich LLP

(57) ABSTRACT

The invention relates to a windshield wiper device (100) for a vehicle, comprising a wiper blade (2) having an elongated upper part (10) and an elongated lower part (12), which are configured to be flexible, at least in part. Furthermore, the device comprises a plurality of connecting elements (18) for connecting the upper part (10) and the lower part (12), which are spaced apart from each other along a longitudinal extension (8) of the wiper blade (2), and which are configured to allow a movement of the upper part (10) and the lower part relative to one another with a motion component along a longitudinal extension (8) of the wiper blade (2). The windshield wiper device (100) further comprises a fastening device. The fastening device comprises a wiper-blade-side
(Continued)

fastening part (20) and a fastening element (50). The wiper-blade-side fastening part (20) and the fastening element (50) are configured in such a manner that, by means of rotation of the wiper-blade-side fastening part relative to the fastening element, an engagement can be formed in order to fix a position of the wiper-blade-side fastening part relative to the fastening element.

10 Claims, 6 Drawing Sheets

(51) Int. Cl.
*B60S 1/40* (2006.01)
*B60S 1/42* (2006.01)

(52) U.S. Cl.
CPC .......... *B60S 1/3429* (2013.01); *B60S 1/3436* (2013.01); *B60S 1/3452* (2013.01); *B60S 1/3454* (2013.01); *B60S 1/3468* (2013.01); *B60S 1/38* (2013.01); *B60S 1/3801* (2013.01); *B60S 1/42* (2013.01); *B60S 2001/3812* (2013.01); *B60S 2001/3825* (2013.01); *B60S 2001/3898* (2013.01)

(58) Field of Classification Search
CPC .... B60S 1/3427; B60S 1/3429; B60S 1/3436; B60S 1/3438; B60S 1/3454; B60S 1/3452; B60S 2001/3825; B60S 2001/3898; B60S 1/38; B60S 1/3801
USPC .................. 15/250.34, 250.351, 250.352
See application file for complete search history.

(56) References Cited

U.S. PATENT DOCUMENTS

| | | | |
|---|---|---|---|
| 6,810,555 B2 | 11/2004 | Ritt | |
| 2006/0218740 A1 | 10/2006 | Coughlin | |
| 2016/0159322 A1* | 6/2016 | Weiler | .......... B60S 1/3411 |
| | | | 15/250.32 |
| 2016/0214574 A1 | 7/2016 | Hackl et al. | |

FOREIGN PATENT DOCUMENTS

| | | | |
|---|---|---|---|
| DE | 1091888 | * | 10/1960 |
| DE | 102011005822 A1 | | 9/2012 |
| DE | 102013214064 | | 5/2014 |
| EP | 0479659 | | 4/1992 |
| EP | 1514752 A1 | | 3/2005 |
| FR | 2103349 | | 4/1972 |
| FR | 2899857 | | 10/2007 |
| JP | H0542020 U | | 6/1993 |
| WO | 2005080159 A1 | | 9/2005 |
| WO | 2008058985 A1 | | 5/2008 |
| WO | 2009089944 A1 | | 7/2009 |
| WO | 2012084358 A1 | | 6/2012 |
| WO | 2013087121 A1 | | 6/2013 |
| WO | 2015032581 | | 3/2015 |

OTHER PUBLICATIONS

Machine language translation of description portion of French publication 2103349, published Mar. 1972.*
International Search Report for Application No. PCT/EP2015/065787 dated Oct. 12, 2015 (English Translation, 3 pages).
International Search Report for Application No. PCT/EP2014/067005 dated Nov. 13, 2014 (English translation, 3 pages).

* cited by examiner

FASTENING DEVICE FOR A WINDSCREEN WIPING DEVICE

BACKGROUND OF THE INVENTION

The invention relates to a windscreen wiping device for a vehicle, in particular a motor vehicle, and in particular a fastening device for a windscreen wiping device.

Windscreen wiping devices typically have a wiper arm or wiper lever, wherein a wiper blade is moved on the windscreen of a motor vehicle. In this case, the wiper blade is moved between a first turning point and a second turning point. To this end, the wiper arm is connected via a drive shaft to a wiper motor. In particular on windscreens with sharp changes of curvature, the wiper blade easily loses contact with the windscreen. As a result, in particular with sharply curved windscreens, this may lead to unwiped wiping regions and/or smearing.

Since a wiping process has to be optimized relative to a plurality of parameters, such as for example the amount of rain on the windscreen, a snow load which is potentially present on the windscreen, the speed of the vehicle and the wind pressure associated therewith on the wiper arm, smearing is not able to be reliably prevented simply by adapting the pressure of the wiper arm to the windshield. Therefore, there is a need for windscreen wiper devices to be further improved.

A plurality of boundary conditions should be additionally considered when carrying out the improvement. These include the complexity of the production process and/or the production costs, the material costs but also the properties of the windscreen wiping device, in particular the function under various conditions and the long service life under a plurality of conditions.

Generally in windscreen wiping devices, in particular in wiper blades, the appearance of wear occurs by the regular use thereof, an impairment to the wiping quality being associated therewith. Moreover, by the exposed position of windscreen wiping devices on the front windscreen or rear window of motor vehicles, in particular when passing through a vehicle cleaning system, there is the risk that the windscreen wiping device is damaged or even torn off. In these cases it is necessary to replace the worn or damaged windscreen wiping devices. Conventionally, the replacement of the windscreen wiping device is relatively complex since generally said windscreen wiping devices are fastened to the drive shaft via screw connections.

SUMMARY OF THE INVENTION

It is the object of the present invention to provide a windscreen wiping device with a fastening device by which at least one or more of the aforementioned drawbacks are reduced or substantially do not occur.

According to one feature of the present invention, a windscreen wiping device for a vehicle with a fastening element, in particular a motor vehicle, is proposed. The windscreen wiping device comprises a wiper blade having an elongated upper part and an elongated lower part which are designed to be at least partially flexible. Moreover, a plurality of connecting elements for connecting the upper part and the lower part are provided, wherein the connecting elements are spaced apart from one another along a longitudinal extent of the wiper blade. The connecting elements are designed to allow a movement of the upper part and the lower part relative to one another with a motion component along a longitudinal extent of the wiper blade. Moreover, the windscreen wiping device comprises a fastening device. The fastening device comprises a fastening part on the wiper blade side. The fastening part on the wiper blade side is configured such that by means of a rotation of the fastening part on the wiper blade side relative to the fastening element, an engagement is able to be formed in order to fix a position of the fastening part on the wiper blade side relative to the fastening element, in particular to fix the position in a releasably connectable manner.

According to a further feature of the present invention, a method for mounting a windscreen wiping device is provided. The method comprises the provision of a windscreen wiping device according to the embodiments described herein. Moreover, the method comprises a fastening of the fastening part on the wiper blade side to the fastening element by forming an engagement of the fastening part on the wiper blade side to the fastening element. In this case, the fastening part on the wiper blade side is rotated relative to the fastening element about a rotational axis which extends substantially transversely to the longitudinal extent of the wiper blade.

Preferred embodiments and particular features of the invention are disclosed from the dependent claims, the drawings and the present description.

According to the windscreen wiping device described herein, comprising a fastening device according to embodiments described herein, and by the method for mounting the windscreen wiping device, a windscreen wiping device which may be mounted and dismantled in a simple manner is provided. Accordingly, in the case of damage the windscreen wiping device may be easily replaced or removed in a simple manner before passing through a vehicle cleaning system and subsequently remounted.

According to embodiments of the disclosure which may be combined with other embodiments described herein, the fastening part on the wiper blade side comprises a first engagement element which is designed to form an engagement with a first securing element of the fastening element. Thus a windscreen wiping device with a fastening device is provided, a position of the fastening part on the wiper blade side being able to be secured thereby relative to the fastening element.

According to embodiments of the disclosure which may be combined with other embodiments described herein, the first engagement element extends substantially transversely to the longitudinal extent of the wiper blade and is preferably of pin-shaped configuration. Thus a fastening device which is able to be produced in a simple and cost-effective manner is provided.

According to embodiments of the disclosure which may be combined with other embodiments described herein, the fastening part on the wiper blade side comprises a second engagement element which is designed to form an engagement with a second securing element of the fastening element. As a result, a windscreen wiping device with a fastening device is provided, a position of the fastening part on the wiper blade side being able to be secured thereby in a particularly stable manner relative to the fastening element.

According to embodiments of the disclosure which may be combined with other embodiments described herein, the second engagement element extends substantially transversely to the longitudinal extent of the wiper blade and is preferably of pin-shaped configuration. Thus a fastening device which is able to be produced in a simple and cost-effective manner is provided, the fastening part on the wiper blade side being able to be secured thereby in a particularly stable manner relative to the fastening element.

According to embodiments of the disclosure which may be combined with other embodiments described herein, the first securing element is configured as an elongated arcuate recess, in particular as a curved slot. As a result, a first securing element which is able to be produced in a particularly simple and cost-effective manner is provided.

According to embodiments of the disclosure which may be combined with other embodiments described herein, the fastening part on the wiper blade side comprises a first guide element and the fastening element comprises a second guide element which are configured to limit substantially a degree of freedom of movement of the fastening part on the wiper blade side perpendicular to the longitudinal extent of the wiper blade, when forming the engagement by means of the rotation of the fastening part on the wiper blade side relative to the fastening element. The mounting and/or dismantling process may be facilitated by a fastening device with a guide according to the embodiments described herein. In particular, the engagement elements and securing elements may be substantially prevented from jamming.

According to embodiments of the disclosure which may be combined with other embodiments described herein, the first engagement element is designed to be resilient. Thus a fastening device is provided, a windscreen wiping device being able to be particularly easily mounted and/or dismantled thereby.

According to embodiments of the method for mounting a windscreen wiping device, the fastening of the fastening part on the wiper blade side to the fastening element also comprises a resilient deformation of the first engagement element. As a result, a method for mounting a windscreen wiping device may be provided, a windscreen wiping device being able to be particularly easily mounted and/or dismantled thereby.

BRIEF DESCRIPTION OF THE DRAWINGS

Exemplary embodiments of the invention are shown in the figures and are described hereinafter in more detail. In the drawings.

DETAILED DESCRIPTION

Figure 1:
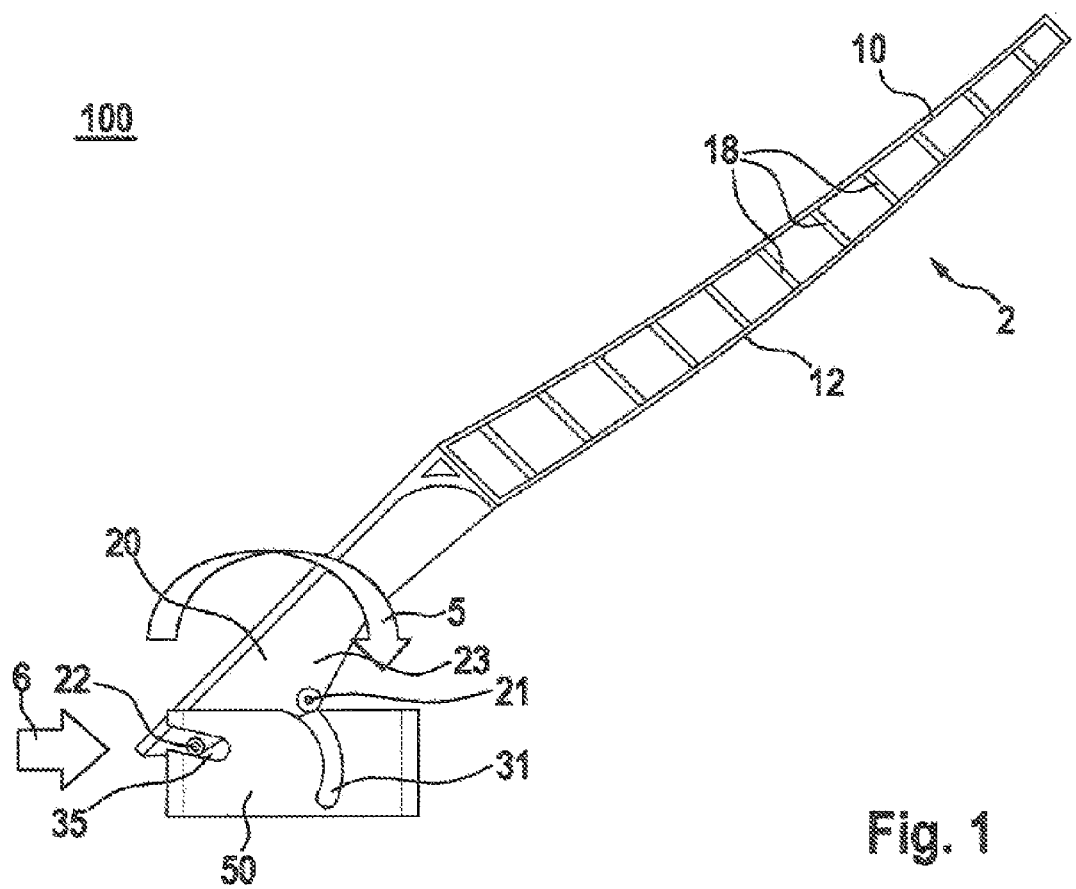
FIG. 1 shows a schematic view of a windscreen wiping device comprising a fastening device according to embodiments of the disclosure in an unfastened state.

The same reference numerals are used hereinafter for elements which are the same and which have the same function, provided nothing different is indicated.

Figure 2:
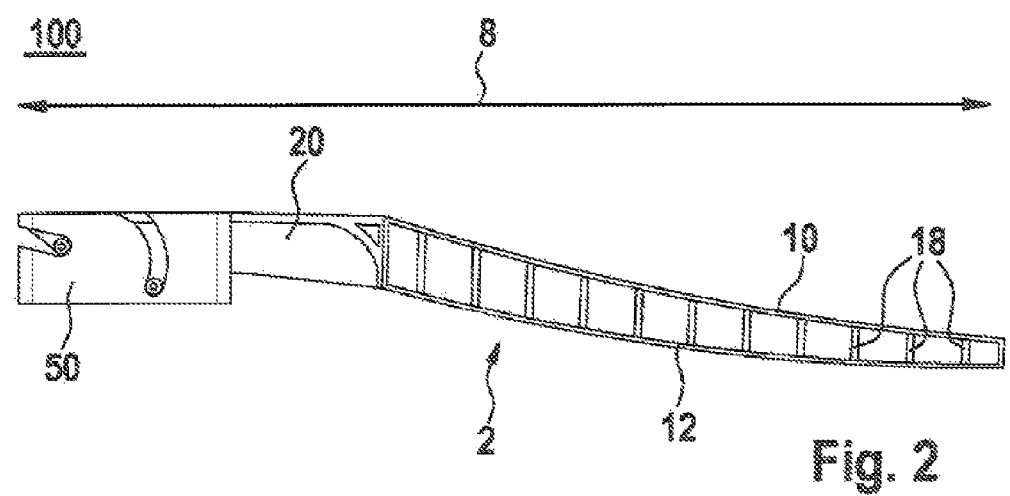
FIG. 2 shows a schematic view of a windscreen wiping device comprising a fastening device according to FIG. 1 in a fastened state.

A windscreen wiping device 100 comprising a fastening device according to embodiments of the disclosure is shown schematically in FIGS. 1 and 2. FIG. 1 shows the windscreen wiping device comprising the fastening device in an unfastened state and FIG. 2 in a fastened state. According to embodiments of the disclosure, the windscreen wiping device 100 comprises a wiper blade 2 with an elongated upper part 10 and an elongated lower part 12 which are configured to be at least partially flexible. Moreover, a plurality of connecting elements 18 for connecting the upper part 10 and the lower part 12 are provided, wherein the connecting elements 18 are spaced apart from one another along a longitudinal extent 8 of the windscreen wiping device 100. The connecting elements 18 are designed to permit a movement of the upper part 10 and the lower part 12 relative to one another with a motion component along a longitudinal extent 8 of the windscreen wiping device 100. Moreover, the windscreen wiping device comprises a fastening device. The fastening device comprises a fastening part 20 on the wiper blade side and a fastening element 50. The fastening part 20 on the wiper blade side and the fastening element 50 are configured such that by means of a rotation of the fastening part 20 on the wiper blade side relative to the fastening element 50 an engagement is able to be formed in order to fix a position of the fastening part 20 on the wiper blade side relative to the fastening element 50.

According to embodiments which may be combined with other embodiments, the fastening part 20 on the wiper blade side and the fastening element 50 are configured such that by rotating the fastening part 20 on the wiper blade side relative to the fastening element 50 about a rotational axis, which extends substantially transversely to the longitudinal extent 8 of the windscreen wiping device 100, a position of the fastening part 20 on the wiper blade side is able to be fixed relative to the fastening element 50. Such a rotation for fastening the fastening part 20 on the wiper blade side to the fastening element 50 is illustrated by way of example in FIG. 1 by the arrow 5.

Thus a windscreen wiping device which may be mounted and dismantled in a simple manner is provided by the embodiments described herein. Accordingly, in the case of damage the windscreen wiping device may be easily replaced or removed in a simple manner before passing through a vehicle cleaning system and subsequently remounted.

Figure 3:
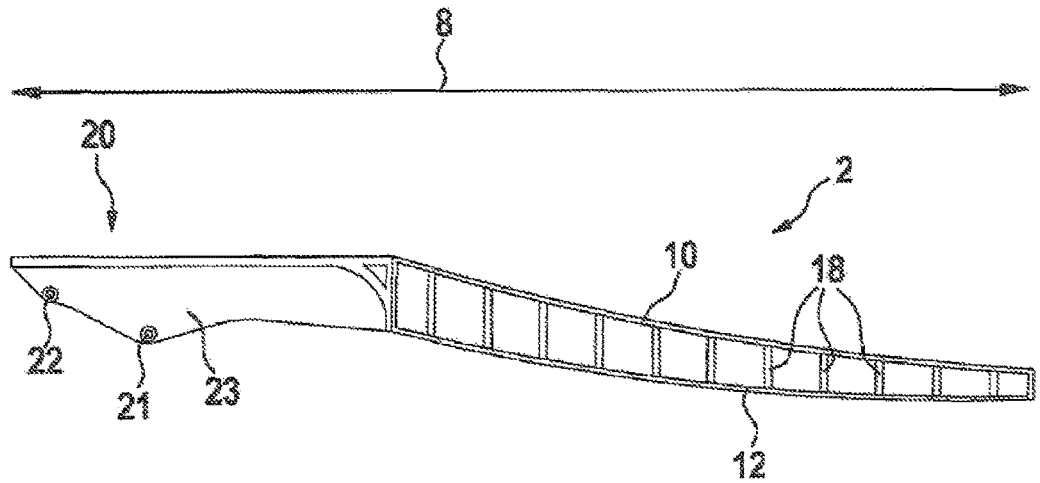
FIG. 3 shows a schematic view of a wiper blade comprising a fastening part on the wiper blade side according to embodiments of the disclosure.

As is shown by way of example in FIGS. 1 to 3, according to embodiments of the windscreen wiping device which may be combined with other embodiments, the fastening part 20 on the wiper blade side may have a first engagement element 21. Typically, the first engagement element 21 is designed to form an engagement with a first securing element 31 of the fastening element 30. According to embodiments described herein, by a rotation about a rotational axis (see arrow 5 in FIG. 1) which extends substantially transversely to the longitudinal extent 8 of the windscreen wiping device 100, the first engagement element 21 may form an engagement with the first securing element 31.

As is shown by way of example in FIGS. 1 to 3, the first engagement element 21 may be configured so that it extends substantially transversely to the longitudinal extent 8 of the windscreen wiping device 100. Preferably, the first engagement element 21 of the windscreen wiping device 100 extends at an angle of 90° relative to the longitudinal extent 8. According to embodiments of the disclosure the first engagement element 21 may be of pin-shaped configuration. Thus a windscreen wiping device may be provided which has a simple fastening device so that the wiper blade may be mounted and dismantled in a rapid and uncomplicated manner. Moreover, the embodiments described herein provide a windscreen wiping device which is able to be produced cost-effectively.

According to embodiments of the windscreen wiping device which may be combined with other embodiments, the fastening part 20 on the wiper blade side may comprise a second engagement element 22, as is shown in FIGS. 1 to 3 by way of example. Typically, the second engagement element 22 is designed to form an engagement with a second securing element 35 of the fastening element 30. According to embodiments described herein, by a linear movement of the second engagement element 22 of the fastening part 20 on the wiper blade side, an engagement may be formed relative to the second securing element 35 of the fastening element 30. Such a linear movement of the fastening part 20 on the wiper blade side, relative to the fastening element 50, is illustrated by way of example by the arrow 6 in FIG. 1. Typically, the end position of the second engagement element 22, i.e. the position in which the second engagement element 22 in the second securing element 35 forms a stop, secures the position of the rotational axis, the fastening part 20 on the wiper blade side being rotated about said rotational axis relative to the fastening element 50 during mounting or dismantling.

According to embodiments of the windscreen wiping device which may be combined with other embodiments, the first engagement element 21 and the second engagement element 22 of the fastening part 20 on the wiper blade side are arranged relative to one another such that, when forming an engagement of the first engagement element 21 with the first securing element 31 and when forming an engagement of the second engagement element 22 with the second securing element 35, a clamped state of the engagement elements 21, 22 is produced.

According to embodiments of the windscreen wiping device which may be combined with other embodiments, the first engagement element 21 and/or the second engagement element 22 of the fastening part 20 on the wiper blade side may be designed to be resilient. As a result, the formation of a substantially continuous clamped state of the engagement elements may be achieved when fastening the fastening part 20 on the wiper blade side to the fastening element 50.

As is shown by way of example in FIGS. 1 to 3, the second engagement element 22 may be configured such that it extends substantially transversely to the longitudinal extent 8 of the windscreen wiping device 100. Preferably, the second engagement element 22 of the windscreen wiping device 100 extends at an angle of 90° relative to the longitudinal extent 8. As in the case of the first engagement element 21, the second engagement element 22 may be of pin-shaped configuration. Thus according to the embodiments described herein, a particularly effective and stable fastening device may be provided for a windscreen wiping device. According to embodiments of the windscreen wiping device which may be combined with other embodiments, the fastening part 20 on the wiper blade side comprises a first guide element 23. As is shown by way of example in FIG. 3, the first guide element 23 may be configured as a protrusion which extends substantially along a longitudinal extent 8 of the windscreen wiping device 100. Typically, the first guide element 23 is centrally arranged relative to the width of the windscreen wiping device 100. Moreover, according to embodiments described herein, the first guide element 23 of the fastening part 20 on the wiper blade side is configured in order to permit with a second guide element 33 of the fastening element 30 a guided rotational movement and/or a guided linear movement of the fastening part 20 on the wiper blade side relative to the fastening element 50. A second guide element 33 of the fastening element 30 according to embodiments of the windscreen wiping device is shown by way of example in FIG. 4B. According to typical embodiments, the second guide element 33 of the fastening element 30 is configured as a slot so that the first guide element 23 configured as a protrusion may be guided in a plane in the direction of the longitudinal extent 8 of the windscreen wiping device during mounting and/or dismantling.

Typically, the first guide element 23 of the fastening part 20 on the wiper blade side and the second guide element 33 of the fastening element 30 are configured in order substantially to limit a degree of freedom of movement of the fastening part 20 on the wiper blade side in a direction along the rotational axis of the rotational movement, when forming the engagement by means of the rotation of the fastening part 20 on the wiper blade side relative to the fastening element 50. The mounting and/or dismantling process may be simplified by a fastening device with a guide according to the embodiments described herein. In particular, the engagement element and the securing element may be substantially prevented from jamming.

Figure 4A:
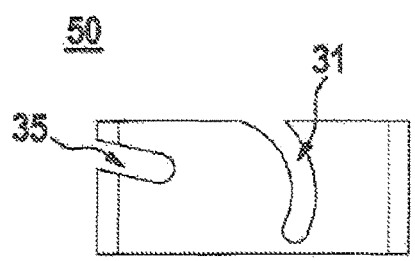
FIG. 4A shows a side view of the fastening element of the fastening device according to embodiments of the disclosure.
Figure 4B:
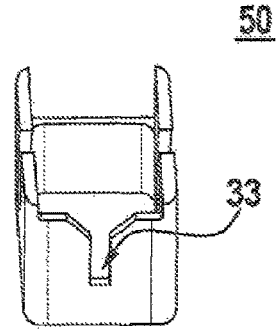
FIG. 4B shows a perspective front view of the fastening element of the fastening device according to embodiments of the disclosure.

By way of example, the fastening element 50 of the fastening device according to embodiments of the disclosure is shown in FIG. 4, wherein FIG. 4A shows a side view and FIG. 4B shows a perspective front view of the fastening element 30 of the fastening device. Typically, the first securing element 31 is configured such that when an engagement of the first engagement element 21 is formed with the first securing element 31, a clamped state of the first engagement element 21 is created. By way of example, the first securing element 31 may be configured as an elongated arcuate recess, in particular as a curved slot. Typically, the curved recess is configured such that a spacing increases between the contact surface of the second engagement element 22 with the second securing element 35 and the contact surface of the first engagement element 21 with the first securing element 31. Typically, the increase of the spacing between the contact surface of the second engagement element 22 with the second securing element 35 and the contact surface of the first engagement element 21 with the first securing element 31 is continuous, wherein in a fastened state of the windscreen wiping device said spacing between the contact surfaces is greater than the spacing between the first engagement element 21 and the second engagement element 22 of the fastening part 20 on the wiper blade side in an unfastened state. Thus in the fastened state a clamped state of the engagement elements is produced.

According to embodiments of the disclosure which may be combined with other embodiments described herein, the curved recess, for example a curved slot, is configured such that when forming an engagement of the first engagement element 21 with the first securing element 31 a spacing is created between the contact surface of the second engagement element 22 with the second securing element 35, and the contact surface of the first engagement element 21 with the first securing element 31 initially increases up to a maximum spacing and subsequently again decreases to a latching position. Typically the increase and/or the decrease of the spacing between the contact surface of the second engagement element 22 with the second securing element 35 and the contact surface of the first engagement element 21 with the first securing element 31 is continuous, wherein in a fastened state of the windscreen wiping device said spacing between the contact surfaces is greater than the spacing between the first engagement element 21 and the second engagement element 22 of the fastening part 20 on the wiper blade side in an unfastened state. Thus, in the fastened state a clamped state of the engagement elements is produced.

By the configuration of a fastening device described herein, in which when forming an engagement the spacing between the contact surface of the second engagement element 22 with the second securing element 35 and the contact surface of the first engagement element 21 with the first securing element 31 initially increases and subsequently decreases, when forming the engagement a maximum clamped state has to be overcome so that a latching mechanism and/or snap mechanism, in particular a continuous latching mechanism and/or snap mechanism, is provided. Typically, when overcoming the maximum clamped state the first engagement element is resiliently deformed. Thus a fastening device is provided, a windscreen wiping device being able to be mounted and/or dismantled thereby in a particularly simple manner.

Exemplary embodiments of a windscreen wiping device are described hereinafter, the fastening device described herein being able to be advantageously used therefor. In principle, the fastening device described herein, however, may also be used for a different windscreen wiping device.

Figure 5A:
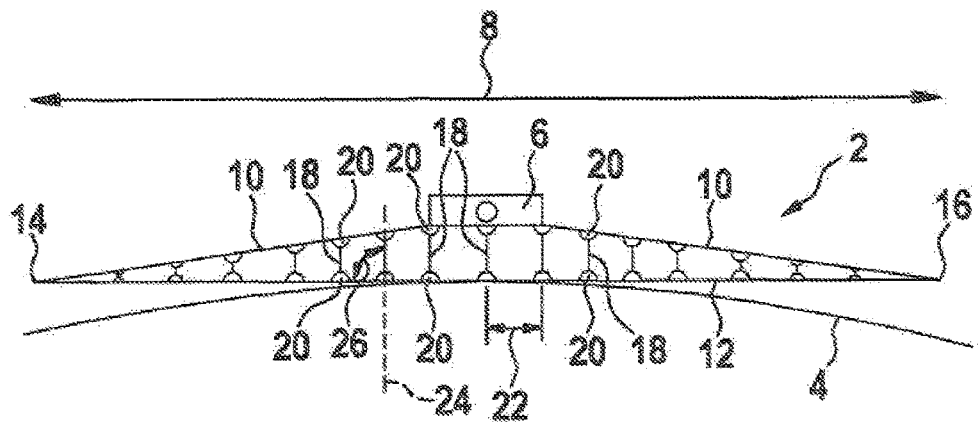
FIG. 5A shows a schematic view of a wiper blade of a windscreen wiping device according to embodiments of the disclosure in a basic position.
Figure 5B:
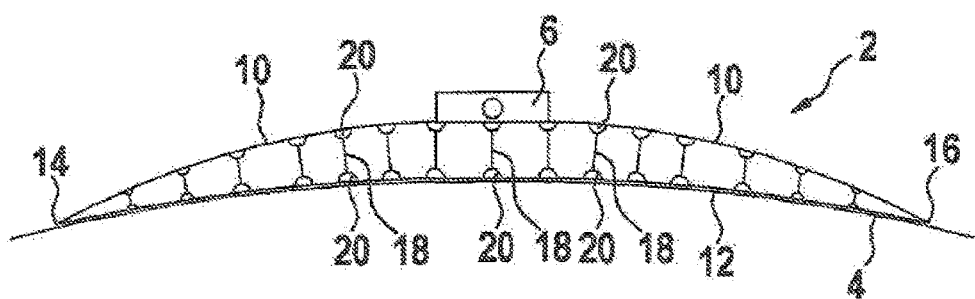
FIG. 5B shows a schematic view of the wiper blade of a windscreen wiping device according to embodiments of the disclosure according to FIG. 5A in a position applied against a windscreen.

FIGS. 5A and 5B show schematic views of a wiper blade 2 in a basic position (FIG. 5A) and in a position applied against a windscreen (FIG. 5B) according to embodiments of the windscreen wiping device of the disclosure. The wiper blade 2 serves for wiping a windscreen 4 of a vehicle which is a motor vehicle, for example, in particular an automobile. Generally, the wiper blade 2 is applied against a windscreen wiper arm which is driven by means of a motor for the wiping procedure. To this end, the wiper blade 2 comprises a mounting 6, said wiper blade being able to be fastened thereby to the windscreen wiper arm. The wiper blade 2 is located in FIG. 5A in a basic position in which it is at least partially lifted away from the windscreen 4. The wiper blade 2 has a longitudinal extent 8 and has an elongated upper part 10 and a similarly elongated lower part 12. The longitudinal extents of the upper part 10 and the lower part 12 substantially correspond to the longitudinal extent 8 of the wiper blade 2.

Both the upper part 10 and the lower part 12 are flexible bars or may be designed as flexible bars, which in each case are configured in one piece by way of example in FIGS. 5A and 5B. This permits a particularly stable construction. It is also possible in each case to design only one part of the upper part 10 and/or the lower part 12 to be flexible. Moreover, alternatively it is possible to design the upper part 10 in two parts, wherein in each case one end of the two parts of the two-part upper part 10 are fastened to the mounting 6.

According to some embodiments which may be combined with the other embodiments described herein, a material which has a modulus of elasticity which ranges between 0.005 kN/mm$^2$, and 0.5 kN/mm$^2$, in particular 0.01 kN/mm$^2$ and 0.1 kN/mm$^2$, is used for the upper part 10 and/or the lower part 12. This permits an appropriate flexibility of the upper part 10 and the lower part 12. Together with a suitably designed cross-sectional surface of the upper part 10 and the lower part 12, an optimal flexural stiffness is thus produced. The upper part 10 and the lower part 12 are arranged such that they oppose one another. Both ends of the upper part 10 are fixedly connected at outer connecting positions 14 and 16 to one respective end of the lower part 12. Otherwise, the upper part 10 and the lower part 12 are spaced apart from one another.

The upper part 10 and the lower part 12 are connected together by connecting elements 18. In particular, in the basic position of the wiper blade 2, said connecting elements extend approximately transversely to the longitudinal extent 8 of the wiper blade 2. The connecting elements 18 are fastened at inner longitudinal sides of the upper part 10 and the lower part 12 facing one another by means of rotary joints 20. The rotary joints 20 in this case are hinges. In particular, the rotary joints 20 may be configured as film hinges. This is advantageous primarily when the upper part 10, the lower part 12 and/or the connecting elements 18 are produced from a plastics material or are covered by a suitable plastics material.

According to typical embodiments described herein, which may be combined with other embodiments described herein, a rotary joint is selected from the following group which consists of: a hinge, a film hinge, a tapering of the material for producing reduced stiffness along a torsional axis, a joint with a rotational axis, a means for connecting the upper part to the connecting element or for connecting the lower part to the connecting element which permits the displacement of the lower part relative to the upper part along the longitudinal extent, etc.

Embodiments in which the joint is provided by a film hinge thus provide a very simple way of providing joints for a fin ray wiper. The wiper blade 2 may be provided in one piece, in particular off-tool. According to typical embodiments the windscreen wiping device, in particular the wiper blade, is produced from one or more materials from a group consisting of: TPE (thermoplastic elastomer), for example TPE-S, TPE-O, TPE-U, TPE-A, TPE-V and TPE-E. The film hinges may have a high degree of elasticity. This may be provided, for example, by a material selected from the group PP, PE, POM and PA. Alternatively, the film hinges may be produced from one or more materials from a group consisting of: TPE (thermoplastic elastomer), for example TPE-S, TPE-O, TPE-U, TPE-A, TPE-V and TPE-E.

The connecting elements 18 are spaced apart from one another along the longitudinal extent of the wiper blade 2. The spacings between two respective adjacent connecting elements 18 are the same. They may, however, also be selected to be different. The spacings are advantageously less than 50 mm, in particular less than 30 mm. As a result, a particularly high degree of flexibility of the windscreen wiping device, in particular of the lower part thereof, and a good adaptation to the curvature and changes in curvature of the windscreen to be wiped may be ensured.

In FIG. 5A a spacing 22 is shown representing the spacings between two respective connecting elements 18. The connecting elements 18, in particular in the basic position of the wiper blade 2, are fastened to the lower part 12 such that their longitudinal axes extend at angles 26 which are between 65° and 115°, in particular between 75° and 105°, to the lower part 12. Particularly advantageously, the angles are between 80° and 100°. This advantageously ensures a particularly good transmission of a force acting on the lower part to the upper part. Moreover, in this manner a particularly stable windscreen wiping device may be achieved. The same applies to the fastenings of the connecting elements 18 to the upper part 10.

In FIG. 5A by way of example for the longitudinal axes of the connecting elements 18 a longitudinal axis 24 is shown, and by way of example for the angles between the connecting elements 18 and the lower part 12 an angle 26 is shown. The spacings between the upper part 10 and the lower part 12 are primarily determined by the lengths of the connecting elements 18. The lengths of the connecting elements 18, proceeding from the two outer connecting positions 14, 16, increase approximately to the points where the mounting 6 attached to the upper part 10 starts. As a result, the upper part 10 and the lower part 12 in the side view of the wiper blade 2 according to FIG. 5A form a double wedge, wherein the tips of the two wedges face in opposing directions. The connecting elements 18 are designed to be buckle-resistant.

FIG. 5B shows a schematic view of the wiper blade 2 according to FIG. 5A in a position applied against the windscreen 4. Since the windscreen 4 has a curvature, when the wiper blade 2 is applied against the windscreen 4 contact-pressure forces act on the lower part 12. Since the upper part 10 and the lower part 12 are flexible bars and the connecting elements 18 are mounted rotatably on the upper part 10 and the lower part 12, the upper part 10 and the lower part 12 are displaceable relative to one another. By the compressive forces acting from below on the lower part 12, the wiper blade 2 bends in the direction from which the compressive forces come, and is applied directly against the curvature of the windscreen 4.

By the construction of the embodiments described herein, in the case of the action of force on the lower part (through the windscreen 4) the lower part flexes in the direction from which the force acts. This is provided by the connection of the upper part 10 and the lower part at a connecting position 14 and/or 16, the shape and by rotary joints at the connection between the connecting elements and the upper and/or lower part.

In the view according to FIG. 5B a small spacing is present between the wiper blade 2 and the windscreen 4 which in this case serves only for illustrating the windscreen 4 and the wiper blade 2 and which in reality is not substantially present when the wiper blade 2 is applied against the windscreen 4. Moreover, a wiper lip which is placed on the windscreen 4 for wiping is typically located on the lower face of the lower part 12 remote from the upper part 10. For reasons of clarity, the wiper lip is not shown in FIGS. 5A and 5B.

A windscreen wiping device according to embodiments described herein uses the effect of tail fins of certain fish which do not deviate in the pressing direction in the case of lateral pressure but flex in the opposing direction, i.e. in the direction from where the pressure comes. This principle is also denoted as the "fin ray" principle. As a result, a windscreen wiper device according to the embodiments described herein has the advantage of an improved adaptation to a windscreen of a motor vehicle. In a conventional windscreen wiper blade, the upper part thereof is generally rigid, i.e. it is not configured to be flexible.

FIGS. 5A and 5B show a wiper blade 2 with a longitudinal extent 8 which substantially extends between the connecting positions 14 and 16. Such an arrangement is frequently used for front windscreen wipers. Alternatively, however, a windscreen wiping device may have only one connecting position, which as in the case of FIGS. 5A and 5B, corresponds to dividing the windscreen wiping device into two, and wherein for example a rotational axis is provided at a position of the mounting 6. Such an arrangement is frequently used for rear window wipers. This is shown by way of example, amongst other things, in FIGS. 6A and 6B. Optional embodiments and details, as are described in the individual embodiments, may be used generally for both variants of an arrangement of a windscreen wiping device.

Figure 6A:
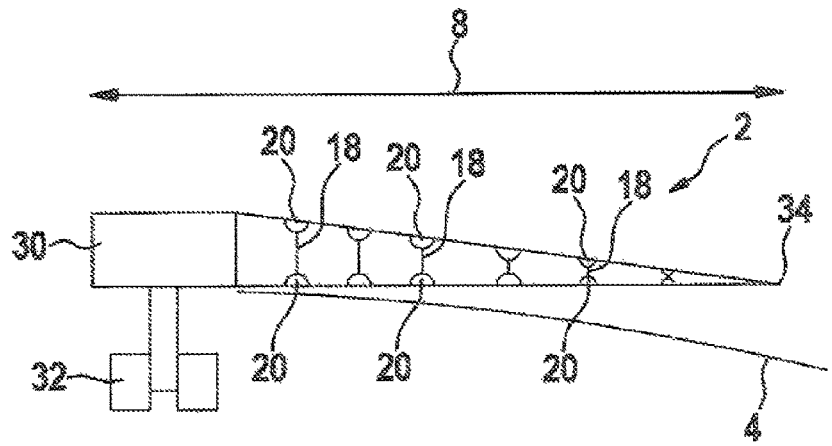
FIG. 6A shows a schematic view of a further exemplary embodiment of a windscreen wiping device according to the invention in the form of a wiper arm with an integrated wiper blade in a basic position.

FIG. 6A shows a schematic view of a further exemplary embodiment of the windscreen wiping device according to the invention in the basic position. The windscreen wiping device in this case is a wiper arm with an integrated wiper blade 2 which is attached to a fastening part 30. The fastening part 30 is connected to a wiper motor 32 which drives the fastening part 30 for wiping the windscreen 4. The wiper blade 2 is designed to be wedge-shaped, wherein one end of the upper part 10 at an outer connecting position 34 is connected fixedly to an end of the lower part 12. The respective other end of the upper part 10 and the lower part 12 are fastened to the fastening part 30. Relative to the basic construction and, in particular, the fastenings of the connecting elements 18 the windscreen wiping device according to FIG. 6A corresponds in principle to that according to FIG. 5A.

Figure 6B:
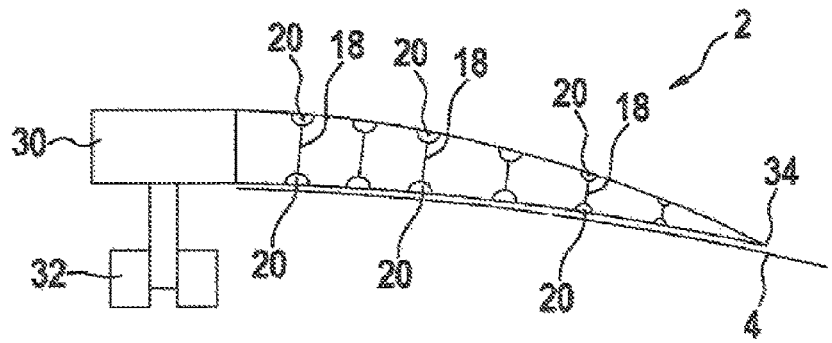
FIG. 6B shows a schematic view of the wiper arm with an integrated wiper blade according to FIG. 6A in a position applied against a windscreen.

FIG. 6B shows a schematic view of the wiper blade 2 with an integrated wiper arm 30 according to FIG. 5B in a position applied against the windscreen 4. Also in this case compressive forces act from below, from the direction of the windscreen 4, onto the lower part 12 of the wiper blade 2 so that the lower part 12 and the upper part 10 flex in the direction of the windscreen 4.

Both in FIG. 5A and in FIG. 6A the wiper blade is shown in its position when it is not applied against the windscreen, such that the lower part 12 is configured to be substantially straight. According to further embodiments which may be combined with other embodiments, the lower part in the unloaded state is of convex configuration, i.e. with a bulged portion which protrudes away from the upper part in a central region. According to the embodiments described herein, typically in the case of contact with a windscreen and starting from the convex shape of the lower part, the windscreen wiping device may adopt the corresponding concave shape of the lower part which is adapted to the windscreen.

Figure 7:
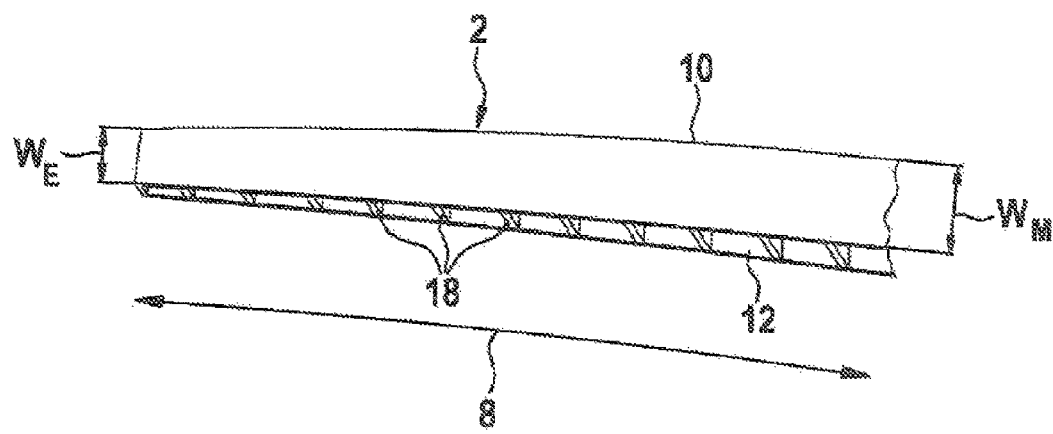
FIG. 7 shows a schematic perspective view of a wiper arm of a windscreen wiping device according to embodiments of the disclosure.

FIG. 7 is a schematic perspective view of a wiper blade 2 of a windscreen wiping device according to embodiments of the disclosure. As shown in FIG. 7, the wiper blade 2 has an outer width $W_E$ at the outer connecting positions where the ends of the elongated upper part 10 and the lower part 12 are connected together. According to typical embodiments, the outer width $W_E$ is at least 15 mm, in particular at least 20 mm, in particular at least 25 mm.

According to embodiments of the disclosure which may be combined with other embodiments, the width of the wiper blade 2 increases from the outer connecting positions in the direction of the fastening part 30 or the mounting 6 where the wiper blade may be fastened to the windscreen wiping arm. In FIG. 7, by way of example an inner width is denoted by $W_M$. According to typical embodiments, the inner width $W_M$ is at least 20 mm, in particular at least 25 mm, in particular at least 30 mm.

Figure 8A:
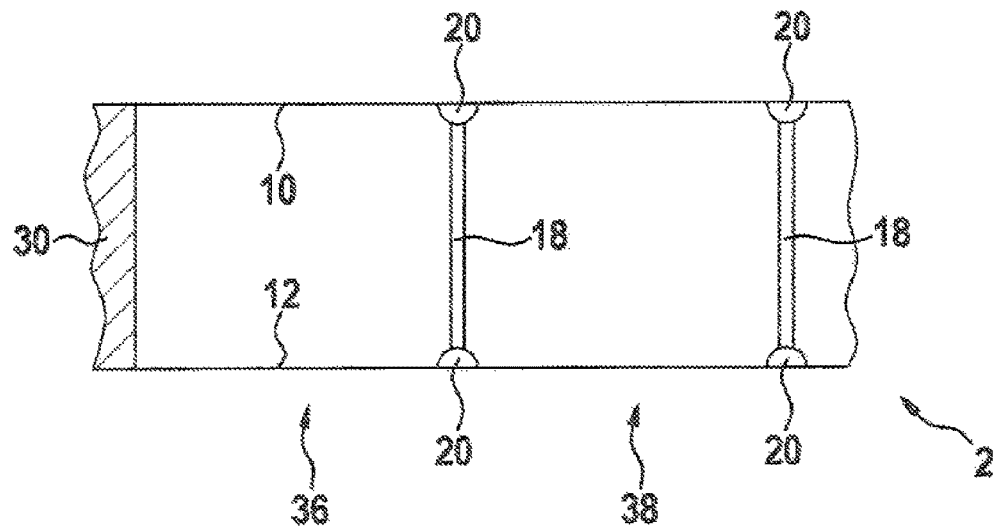
FIG. 8A shows a schematic view of a detail of the wiper blade according to FIG. 6A.

FIG. 8A shows a schematic view of a detail of the wiper blade 2 according to the exemplary embodiment according to FIG. 6A in which the wiper blade 2 is in the basic position. The left-hand end region of the wiper blade 2 where one end of the upper part 10 and one end of the lower part 12 are fastened to the fastening part 30 is shown. Starting from the transition from the fastening part 30 to the wiper blade 2 FIG. 8A shows the first two connecting elements 18 which define two wiper blade elements 36 and 38. The connecting elements 18 are fastened via rotary joints 20 to the upper part 10 and the lower part 12.

Figure 8B:
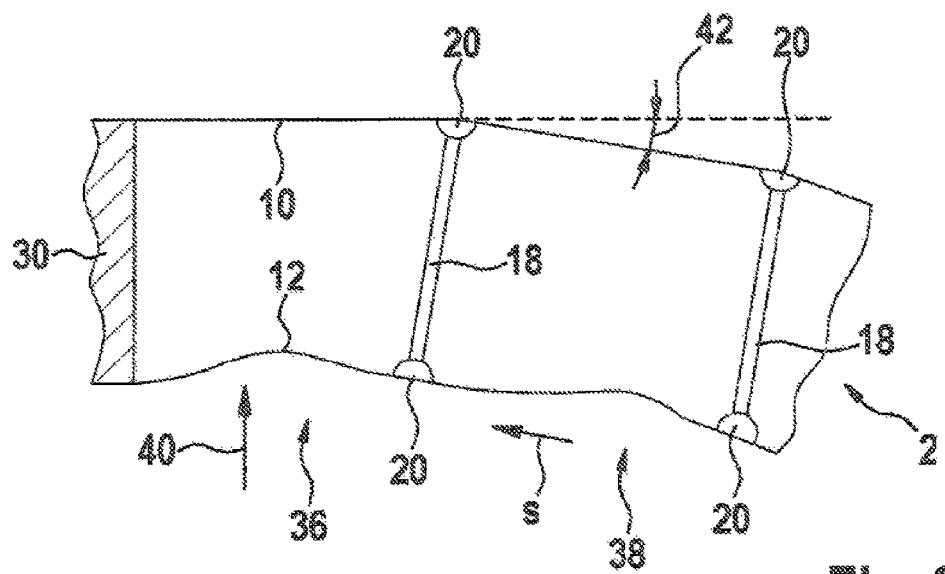
FIG. 8B shows a schematic view of a detail of the wiper blade according to FIG. 6B.

FIG. 8B shows a schematic view of a detail of the wiper blade 2 according to the exemplary embodiment of FIG. 6B in which the wiper blade 2 is applied against the windscreen 4. Compressive forces act from below on the lower part 12 from the direction away from the windscreen. A compressive force 40 is shown as representative of the compressive forces in FIG. 8B. The compressive force 40 effects a bulging and bending of the lower part 12 of the wiper blade element 36. As a result, the rotary joint 20 of the first connecting element 18 is displaced to the left by a path s. The second wiper blade element 38 flexes downwardly in the direction from which the compressive force 40 comes and is applied against the windscreen. At the same time, an angle 42 is formed between the first wiper blade element 36 and the second wiper blade element 38. Moreover, a further compressive force is formed, said compressive force then acting on the lower part 12 of the second wiper blade element 38 and preventing a further bending of the second wiper blade element 38 downwardly. A chain reaction is produced with the wiper blade element adjacent to the right, as far as the end of the wiper blade 2.

Figure 9:
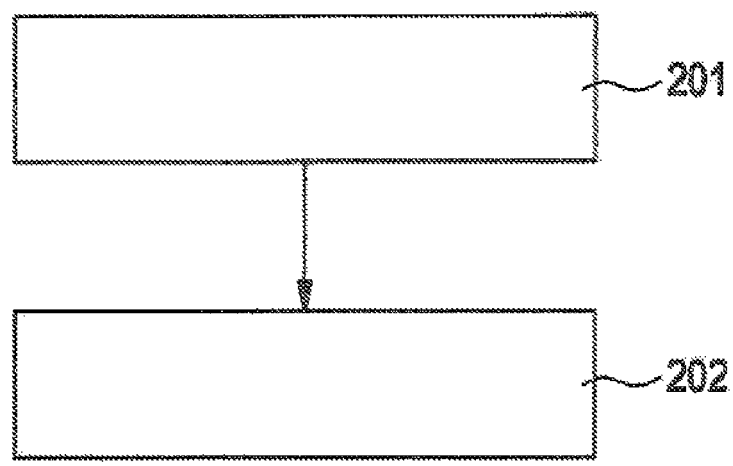
FIG. 9 shows a flow diagram for illustrating embodiments of the method for mounting a windscreen wiping device according to embodiments of the disclosure.

A flow diagram is shown for illustrating the embodiments of the method for mounting a windscreen wiping device in FIG. 9. According to embodiments of the method, the method comprises a provision 201 of a windscreen wiping device according to the embodiments described herein. Moreover, the method comprises a fastening 202 of the fastening part 20 on the wiper blade side to the fastening element 50 by forming an engagement of the fastening part 20 on the wiper blade side with the fastening element 50, and a rotating of the fastening part on the wiper blade side relative to the fastening element about a rotational axis which extends substantially transversely to the longitudinal extent 8 of the windscreen wiping device 100.

According to embodiments of the method for mounting a windscreen wiping device, the fastening 202 of the fastening part 20 on the wiper blade side to the fastening element 50 also comprises a resilient deformation of the first engagement element 21 and/or the second engagement element 22.

According to embodiments of the method for mounting a windscreen wiping device which may be combined with other embodiments, the fastening 202 of the fastening part 20 on the wiper blade side to the fastening element 50 comprises the forming of a clamped state of the first engagement element 21 and/or of the second engagement element 22. In this case, the first engagement element 21 and the second engagement element 22 of the fastening part 20 on the wiper blade side and the first securing element 31 and the second securing element 35 of the fastening element are configured according to the embodiments described herein.

The connecting element 18, in particular outside its rotary joints 20, has a thickness which is greater than or equal to 0.4 millimeters. In particular, this thickness is less than 3 millimeters, preferably between 0.6 millimeters and 2 millimeters, ideally approximately 1 millimeter to 1.7 millimeters, for example approximately 1.5 millimeters.

Moreover, the connecting element 18 is configured to be substantially buckle-resistant and flexurally stiff. This means that said connecting elements are designed such that they permit a movement of the upper part 10 and the lower part 12 relative to one another with a motion component along the longitudinal extent 8 of the wiper blade 2. In this case the connecting elements 18 on the upper part 10 are connected at one respective upper connecting position and on the lower part 12 at one respective lower connecting position. For example, in each case a rotary joint 20 is provided at the connecting positions. With a movement of the upper part 10 and of the lower part 12 relative to one another, the spacing from an upper connecting position to a lower connecting position on the same connecting element does not alter substantially, i.e. the spacing is constant with deviations of, for example, ±1 mm in particular ±0.3 mm.

Thus by the embodiments described herein of the windscreen wiping device and by the method for mounting the windscreen wiping device, a windscreen wiping device which may be mounted and dismantled in a simple manner is provided. Accordingly, in the case of damage the windscreen wiping device may be easily replaced or removed in a simple manner before passing through a vehicle cleaning system and subsequently remounted.

What is claimed is:

1. A windscreen wiping device (100) for a vehicle with a fastening element (50), comprising a wiper blade, having
   an elongated upper part (10) which is configured to be at least partially flexible,
   an elongated lower part (12) which is configured to be at least partially flexible,
   a plurality of connecting elements (18) for connecting the upper part (10) and the lower part (12), wherein the connecting elements (18) are spaced apart from one another along a longitudinal extent (8) of the wiper blade (2), and wherein the connecting elements (18) are configured to allow a movement of the upper part (10) and the lower part relative to one another with a motion component along the longitudinal extent (8) of the wiper blade (2), wherein the connecting elements (18) substantially have a thickness which is greater than or equal to 0.4 mm, and
   a fastening device comprising a fastening part (20) on a wiper blade side, wherein the fastening part (20) on the wiper blade side is configured such that by means of a rotation of the fastening part (20) on the wiper blade side relative to the fastening element (50) an engagement is able to be formed in order to fix a position of the fastening part (20) on the wiper blade side relative to the fastening element (50)
   wherein the fastening part (20) includes a first, elastic pin (21) extending perpendicular to the longitudinal direction, and a second pin (22) spaced from the first pin (21) and extending perpendicular to the longitudinal direction, wherein the fastening element (50) includes a first, arcuate-shaped hole (31) that receives the first pin (21) during assembly of the fastening part (20) onto the fastening element (50), and wherein the fastening element (50) includes a second, linear hole (35) that receives the second pin (22) during assembly of the fastening part (20) onto the fastening element (50), wherein the first pin (21) is configured to travel along an arcuate pathway along the arcuate-shaped hole (31) during the engagement, and is configured to be elastically deformed as it travels along the arcuate-shaped hole (31).

2. The windscreen wiping device (100) as claimed in claim 1, wherein the fastening part (20) on the wiper blade side comprises a first guide element (23) and the fastening element (50) comprises a second guide element (33) which are configured to limit substantially a degree of freedom of movement of the fastening part (20) on the wiper blade side perpendicular to the longitudinal extent (8) of the wiper blade (2), when forming the engagement by means of the rotation of the fastening part (20) on the wiper blade side relative to the fastening element (50).

3. A method for mounting a windscreen wiping device, comprising:
providing (201) a windscreen wiping device as claimed in claim 1, and
fastening (202) the fastening part (20) on the wiper blade side to the fastening element (50) by forming an engagement of the fastening part (20) on the wiper blade side to the fastening element (50) and rotating the fastening part on the wiper blade side relative to the fastening element about a rotational axis which extends substantially perpendicular to the longitudinal extent (8) of the wiper blade (2).

4. The method for mounting a windscreen wiping device as claimed in claim 3, wherein the fastening (202) of the fastening part (20) on the wiper blade side to the fastening element (50) further comprises a resilient deformation of the first pin (21).

5. The windscreen wiping device (100) as claimed in claim 1, wherein the engagement is able to be formed in order to fix a position of the fastening part (20) on the wiper blade side relative to the fastening element (50) in a releasably connectable manner.

6. The windscreen wiping device (100) as claimed in claim 1, wherein the first pin (21), the second pin (22), the first recess (31), and the second recess (35) are arranged such that when the fastening part (20) is being rotated and assembled onto the fastening element (50), the first pin (21) experiences an increase in tension applied thereto and is thereby elastically deformed.

7. The windscreen wiping device (100) as claimed in claim 1, wherein the second, linear hole extends along an axis that intersects the first, arcuate hole, and wherein the first, arcuate hole is non-concentric with respect to the second, linear hole.

8. The windscreen wiping device (100) as claimed claim 1, wherein the first securing element opens along a first edge of the fastening element (50) and the second securing element opens along a second edge of the fastening element (50), and wherein the first edge is perpendicular to the second edge.

9. The windscreen wiping device (100) as claimed in claim 1, wherein the rotation is about an axis that is perpendicular to an axis of rotation of the wiping device during use on a windshield.

10. The windscreen wiping device (100) as claimed in claim 1, wherein the fastening part (20) on the side of the wiper blade is configured so that an engagement can be formed by means of a rotation of the fastening part (20) on the side of the wiper blade relative to the fastening element (50) in order to fix a position of the fastening part (20) on the side of the wiper blade relative to the fastening element (50) in a detachably connectable manner.

* * * * *